(12) United States Patent
Vechev et al.

(10) Patent No.: US 8,495,588 B2
(45) Date of Patent: Jul. 23, 2013

(54) ABSTRACTION-GUIDED SYNTHESIS

(75) Inventors: Martin Vechev, Yorktown Heights, NY (US); Eran Yahav, Yorktown Heights, NY (US); Greta Yorsh, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 743 days.

(21) Appl. No.: 12/762,002

(22) Filed: Apr. 16, 2010

(65) Prior Publication Data

US 2011/0258606 A1   Oct. 20, 2011

(51) Int. Cl.
*G06F 9/44*   (2006.01)
(52) U.S. Cl.
USPC .......................................................... 717/128
(58) Field of Classification Search
USPC .......................................................... 717/131
See application file for complete search history.

(56) References Cited

U.S. PATENT DOCUMENTS

| | | | | |
|---|---|---|---|---|
| 6,944,838 | B2* | 9/2005 | McMillan | 716/106 |
| 7,856,609 | B2* | 12/2010 | Baumgartner et al. | 716/105 |
| 2005/0166167 | A1* | 7/2005 | Ivancic et al. | 716/5 |
| 2006/0282807 | A1* | 12/2006 | Ivancic et al. | 716/5 |
| 2011/0088016 | A1* | 4/2011 | Ball et al. | 717/128 |

OTHER PUBLICATIONS

Barbara Jobstmann et al., "Program repair as a game", 2005 pp. 226-238.*
Roderick Bloem et al., "Better Quality in Synthesis through Quantitative Objectives", 2009, pp. 140-156.*
Martin Vechev, "Deriving Linearizable Fine-Grained Concurrent Objects", 2008, pp. 125-135.*
Cousot et al., Abstract interpretation: A unified lattice model for static analysis of programs by construction of approximation of fixed points, In POPL, 1977, pp. 238-252.
Clarke et al., Counterexample-guided abstraction refinement, In CAV, 2000, pp. 154-169.
Ball et al, Automatically validating temporal safety properties of interfaces, In SPIN, 2001, pp. 103-122.
Blanchet et al., A static analyzer for large safety-critical software, in PLDI, 2003, pp. 196-207.
Mine, The octagon abstract domain. Higher Order Symbol. Comput., 2006, pp. 31-100, 19, 1.
Henzinger et al., Lazy abstraction, In POPL, 2002, pp. 58-70.

* cited by examiner

*Primary Examiner* — Wei Zhen
*Assistant Examiner* — Lanny Ung
(74) *Attorney, Agent, or Firm* — Scully, Scott, Murphy & Presser, P.C.; Louis J. Percello, Esq.

(57) ABSTRACT

Given a program P, a specification S, and an abstraction function α, verification determines whether P satisfies the specification S under the abstraction α. If not, a trace T that violate the specification is selected, and either the abstraction α is refined or a constraint that avoids the trace T is computed and added to a set of constraints. The set of constraints are used to modify the program P.

21 Claims, 7 Drawing Sheets

```
T1 {              T2 {              T3 {              f (x) {
1: x += z         1: z++            1: y1 = f(x)         if (x==1)
2: x += z         2: z++            2: y2 = x               return 3;
}                 }                 3: assert            else if (x==2)
                                    (y1≠ y2)                return 6;
                                    }                    else return 5;
                                                      }
```

| Algorithm 1: Abstraction-Guided Synthesis |
|---|
| Input: Program P, Specification S, Abstraction $\alpha$<br>Output: Program satisfying S, under $\alpha$<br>$\varphi = true$<br>while ($[\![P]\!]\alpha \cap [\![\varphi]\!] \not\models S$) do<br>    select $\pi$ such that $\pi \in [P]\alpha \cap [\varphi]$ and $\pi \not\models S$<br>    if * then<br>        $\psi = avoid(\pi)$<br>        if $\psi \neq false$ then $\varphi = \varphi \wedge \psi$<br>        else abort<br>    else<br>        $\alpha' = refine\,(\alpha, \pi)$<br>        if $\alpha' \neq \alpha$ then $\alpha = \alpha'$<br>        else abort<br>    end<br><br>end<br>return $implement\,(P, \varphi)$ |
| Function avoid($\pi$) |
| Input: Trace $\pi$<br>Output: Atomicity constraint for avoiding $\pi$<br>$p = false$<br>for each $i = 0, ..., |\pi|$ do<br>    *if exists $j > i+1$ such that $tid(\pi_i) = tid(\pi_j)$ and<br>    for all such that $i < l < j$, $tid(\pi_i) \neq tid(\pi_l)$*<br>    then $\rho = \rho \vee [lbl(\pi_i), lbl(\pi_j)]$<br>end<br>return $\rho$ |
| Function implement (P,$\varphi$) |
| Input: Program P, atomicity formula $\varphi$<br>Output: Program with atomic sections satisfying $\varphi$<br>Find a minimal satisfying assignment $\Gamma \models \varphi$<br>P' = P with adding atomic sections in *atomize*($\Gamma$)<br>return P' |

FIG. 5

```
       Algorithm 2:  Abstraction-Guided Synthesis
       Input:  Program P, Specification S, Abstraction α
       Output:  Program satisfying S under α
 1     states = workset = Init^h
 2     φ = true
 3     while workset is not empty do
 4          σ = select and remove state from workset
 5          for each Statement st that is φ-enabled in σ do
 6               for each σ' ∈ [st]_α(σ) do
 7                    if σ' ⊮ S  then
 8                         select
                              π ∈ Traces (init, σ', states \ workset, φ)
 9                         if shouldAvoid(π) then
10                              ψ = avoid(π)
11                              if ψ ≠ false  then
12                                   φ = φ ∧ ψ
13                                   states= workset=Init^h
14                              else abort
15                         else
16                              // refine(π)
17                         end
18                    else
19                         if {σ'} ⊈ states  then
20                              states= states ⊔ {σ'}
21                              workset = workset ⊔ {σ'}
22                         end
23                    end
24               end
25          end
26     end
27     return implement (P,φ)
```

FIG. 6

```
Function traces (s,t,states,φ)
    Input: State s, State t, Set of States states s, Atomicity Formula φ
    Output: Set of interleavings from to passing in V, satisfying φ
1   workset = all transitions incoming to t
2   workset = φ
3   while workset is not empty do
4       π = select and remove interleaving from workset
5       for each σ ∈ states and st such that st is φ-enabled in σ
6
7       and exists σ'∈[st]_α(σ) s.t. σ' ⊑ src(π_0) do
8           let t be transition (σ,σ') with stmt(t)=st in
            π' = t.π
9           if π' ⊨ φ then
10              if σ== s then result=result ∪ {π'}
11              else workset = workset ∪ {π'}
12          end
13      end
14  end
15  return result
```

FIG. 7

```
T1 {               T2 {
  while (*) {        if (x==1) {
    x++                assert false
    x++              }
  }                }
}
```

FIG. 8

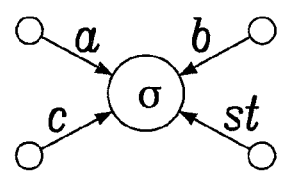

FIG. 9

ABSTRACTION-GUIDED SYNTHESIS

FIELD

The present disclosure relates generally to computer systems, software and applications, and more particularly to verifying computer programs.

BACKGROUND

Program verifications such as inferring efficient synchronization in concurrent programs are tasks known to be difficult and error-prone when done manually. Existing approaches include uses of temporal specifications to generate synchronization skeletons. Other works consider the problem of program repair as a game.

The problem of restricting the program to valid executions can be addressed by monitoring the program at runtime and forcing it to avoid executions that violate the specification. However, restricting the executions of a program at runtime requires a recovery mechanism in case the program already performed a step that violates the specification, and/or a predictive mechanism to check whether future steps lead to a violation. Existing approaches using recovery mechanisms typically require user annotations to define a corrective action to be taken when the specification is violated.

BRIEF SUMMARY

A method and system for abstraction-guided synthesis are provided. The method, in one aspect, may include receiving a program P, a specification S that describes desired properties of the program P, an abstraction A that defines a method for over-approximating behaviors of the program P using a bounded representation. The method may also include initializing constraint C to true and enumerating abstract traces of the program P that satisfy the constraint C. The method may further include determining whether there is a trace in the abstract traces violating the specification S. In response to determining that there is a trace that violates the specification S, the method may further include selecting a trace T that violates the specification S and determining whether to refine the abstraction A. In response to determining to refine the abstraction A, the method may include refining abstraction A to avoid the trace T that violates the specification S, and setting the abstraction A to be the refined abstraction.

In response to determining that the abstraction A should not be refined, the method may include computing one or more constraints that avoid the trace T that violates the specification S, and adding the constraint to the constraint C. The may further include returning to the step of enumerating and repeating the step of determining. In response to determining that there is no trace that violates the specification S, the method may include generating program P' that modifies the program P by including one or more constraints specified in the constraint C.

A method for abstraction-guided synthesis, in another aspect, may include enumerating abstract traces of a program P and determining a trace in the abstract traces violating a specification S that describes the program P. The method may also include computing one or more constraints that avoid the trace T that violates the specification S, and adding the constraint to constraint C, repeating the steps of enumerating, determining and computing. The method may further include, in response to determining that there is no trace that violates the specification S, generating program P' that modifies the program P by including one or more constraints specified in the constraint C.

A system for abstraction-guided synthesis, in one aspect, may include a memory device operable to store a program P, a specification S that describes desired properties of the program P, an abstraction A that defines a method for over-approximating behaviors of the program P using a bounded representation. The system may also include a processor operable to initialize constraint C to true, enumerate abstract traces of the program P that satisfy the constraint C and determine whether there is a trace in the abstract traces violating the specification S. The processor in response to determining that there is a trace that violates the specification S, may be further operable to select a trace T that violates the specification S, determine whether to refine the abstraction A. The processor in response to determining to refine the abstraction A, may be further operable to refine the abstraction A to avoid the trace T that violates the specification S, and set the abstraction A to be the refined abstraction. The processor in response to determining that the abstraction A should not be refined, may be also operable to compute one or more constraints that avoid the trace T that violates the specification S, and add the constraint to the constraint C. The processor may be further operable to repeat the enumeration of abstract traces and computing of one or more constraints. The processor in response to determining that there is no trace that violates the specification S, may be further operable to generate program P' that modifies the program P by including one or more constraints specified in the constraint C.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIG. 5 illustrates abstraction-guided synthesis algorithm in a declarative manner.

FIG. 6 illustrates abstraction-guided synthesis algorithm in detail.

FIG. 7 illustrates an algorithm for function traces.

FIG. 8 illustrates another example of a program that may be verified.

FIG. 9 illustrates a partial state space for exploring abstract states.

DETAILED DESCRIPTION

Figure 1:
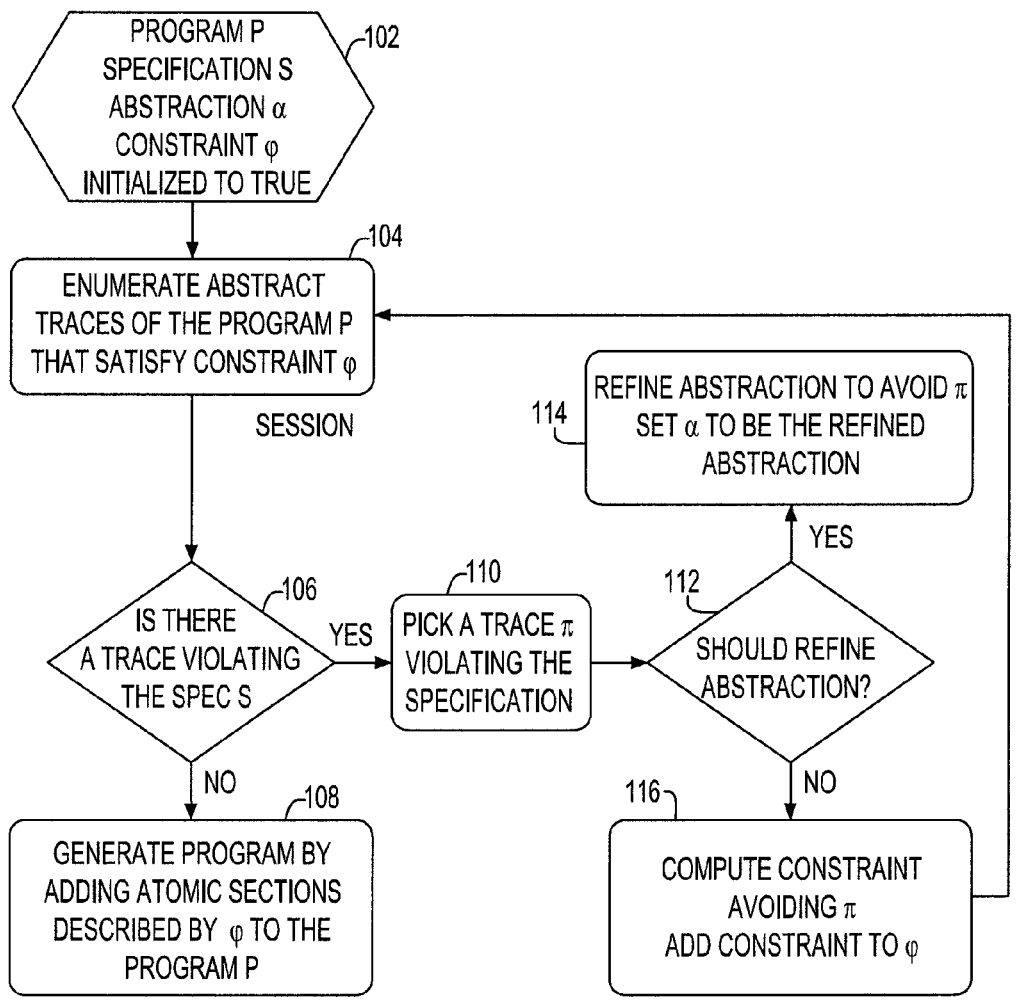
FIG. 1 is a flow diagram illustrating an algorithm for obtaining such P' from the initial program P.

Abstraction-guided synthesis is disclosed which provides an approach for verifying that a program meets its specification. The approach in the present disclosure turns the one dimensional problem of verification under abstraction, in which only the abstraction can be modified (typically via abstraction refinement), into a two-dimensional problem, in which both the program and the abstraction can be modified until the abstraction is precise enough to verify the program.

In one aspect, the technique of the present disclosure is based on abstract interpretation and can infer synchronization for infinite state programs. Given a program, a specification, and an abstraction, the technique of the present disclosure infers synchronization that avoids all interleavings that may violate the specification, but permits as many valid interleavings as possible. Although it is possible to apply the technique to other settings, the present disclosure describes concurrent programs as examples of the programs in which the abstraction-guided synthesis of the present disclosure may be applied for synthesizing efficient synchronization. In one aspect, both the program and the abstraction can be modified on-the-fly during the verification process. The ability to modify the program, and not only the abstraction, allows for the ability to remove program interleavings not only when they are known to be invalid, but also when they cannot be verified using the given abstraction.

An execution of a parallel program can be viewed as an interleaving of the operations of the executing threads.

Based on abstract interpretation, in one aspect, the technique of the present disclosure synthesizes a symbolic characterization of safe schedules for concurrent infinite-state programs. A schedule is considered as "safe" when it does not violate the user-provided specification. Safe schedules can be realized by modifying the program or the scheduler:

Concurrent programming: by automatically inferring minimal atomic sections that prevent unsafe schedules, the programmer is enabled in building correct and efficient concurrent software, a task known to be difficult and error-prone.

Benevolent runtime: a scheduler that always keeps the program execution on a safe schedule makes the runtime system more reliable and adaptive to ever-changing environment and safety requirements, without the need to modify the program.

Abstract interpretation is described in Cousot, P., and Cousot, R. Abstract interpretation: A unified lattice model for static analysis of programs by construction of approximation of fixed points, In POPL (1977), pp. 238-252.

Given a program P, a specification S, and an abstraction function $\alpha$, verification determines whether $P|=\alpha S$, that is, whether P satisfies the specification S under the abstraction $\alpha$. When the answer to this question is negative, it may be the case that the program violates the specification, or that the abstraction $\alpha$ is not precise enough to show that the program satisfies it.

When $P|\neq\alpha S$, abstraction refinement approaches share the common goal of trying to find a finer abstraction $\alpha'$ such that $P|\alpha'S$. In the present disclosure, a complementary approach is presented, of finding a program P' such that $P'|=\alpha S$ under the original abstraction $\alpha$ and P' admits a subset of the behaviors of P. Furthermore, the two directions are combined—refining the abstraction, and restricting program behaviors, to yield a novel abstraction-guided synthesis algorithm.

FIG. 1 is a flow diagram illustrating an algorithm for obtaining such P' from the initial program P. Changes on a concurrent program P are considered that correspond to restricting interleavings by adding synchronization. The algorithm iteratively eliminates invalid interleavings until the abstraction is precise enough to verify the program. Some of the (abstract) invalid interleavings it observes may correspond to concrete invalid interleavings, while others may be artifacts of the abstraction. Whenever the algorithm observes an (abstract) invalid interleaving, the algorithm tries to eliminate it by either (i) modifying the program, or (ii) refining the abstraction.

To refine the abstraction, the algorithm can use any techniques (see for example, Clarke, E. M., Grumberg, O., Jha, S., Lu, Y., and Veith, H., Counterexample-guided abstraction refinement, In CAV (2000), pp. 154-169; Ball, T., and Rajamani, S. K., Automatically validating temporal safety properties of interfaces, In SPIN (2001), pp. 103-122). These include moving through a predetermined series of domains with increasing precision (and typically increasing cost), or refining within the same abstract domain by changing its parameters (see for example, Blanchet, B., Cousot, P., Cousot, R., Feret, J., Mauborgne, L., Min'e, A., Monniaux, D., and Rival, X., A static analyzer for large safety-critical software, In PLDI (2003), pp. 196-207).

To modify the program, the algorithm generates and solves atomicity constraints. Atomicity constraints define which statements have to be executed atomically, without an intermediate context switch, to eliminate the invalid interleavings. This corresponds to limiting the non-deterministic choices available to the scheduler. A solution of the atomicity constraints can be implemented by adding atomic sections to the program.

The approach in the present disclosure separates the process of identifying the space of solutions (generating the atomicity constraints) from the process of choosing between the possible solutions, which can be based on a quantitative criterion. The approach of the present disclosure provides a solution to a quantitative synthesis problem, as it can compute a minimally atomic safe schedule for a program, a schedule that poses minimal atomicity constraints on interleavings, and does not restrict interleavings unnecessarily.

Furthermore, the approach in the present disclosure can be instantiated with different methods for: (i) modifying the program to eliminate invalid interleavings (ii) refining the abstraction (iii) choosing optimal solutions (quantitative criterion) (iv) implementing the resulting solution in a program.

Referring to FIG. 1, at 102, program P, specification S, and abstraction $\alpha$ are given. The constraint $\phi$ is initialized to true, denoting that initially all program interleavings are permitted. Program P may be a computer code. Specification S may be pseudo-code or other machine readable form that describes or corresponds to Program P. Specification S describes desired properties of program P, i.e., what is desired of the program P to do. Abstraction a defines a method for over-approximating the possible behaviors of P using a bounded representation. For instance, an abstraction of a program can map the values of variables in the program to an abstract bounded domain such that the state-space of the program under abstraction is finite. The algorithm shown in FIG. 1 computes constraints or interleavings to be avoided in the program P such that all executions of P that satisfy the constraint $\phi$ are guaranteed to satisfy the specification S under the abstraction $\alpha$.

At 104, abstract traces of the program P that satisfy constraint $\phi$ are enumerated. For instance, the program P is run with all possible values of parameters as defined in the abstraction $\alpha$, i.e., in a finite domain. Abstract traces refer to program trace generated as a result of abstract interpretation of the program P under the abstraction $\alpha$. At 104, if constraint $\phi$ is true, all traces would satisfy the constraint. For example, initially, constraint $\phi$ is set to true, and thus, the first time through the loop (steps, 104, 106, 110, 112, 116, 114), all abstract traces may be enumerated at 104.

At 106, if there is a trace violating the specification S, the control flows to 110. Otherwise, the control flows to 108. To determine if a trace violates the specification S, the specification may be evaluated over the trace. For example, if the specification requires that at the final state of the program some variable holds a certain value, the state at the end of the trace may be compared to the one required by the specification. This can be done automatically.

At 110, a trace π violating the specification is selected. Which one to select may be based on the user or design choice. The different choices do not affect the correctness of the method of the present disclosure, but different choices may lead to different results.

At 112, it is determined whether the abstraction should be refined or the program should be modified. This choice can be made non-deterministically, or based on a deterministic criterion. In some cases, it may not be possible to refine the abstraction, and so only the choice of modifying the program is available. In some cases, attempting enumeration of traces with a refined abstraction may run out of space and/or time, but this cannot be known a priori. Therefore, it is possible to use a back-tracking scheme in which the algorithm tries both options—refinement of the abstraction, and program restriction, and proceed as far as compute resources are available.

If at 112, it is determined that the abstraction should be refined, abstraction is refined to avoid the trace π violating the specification at 114. Abstraction refinement can be performed using standard existing techniques. The processing continues to 104.

If at 112, it is determined that it is not the abstraction that should be refined, the control flows to 116. At 116, constraint avoiding π is computed and added to the constraint φ. The processing continues to 104.

At 108, program P' is generated by adding atomic sections described by the constraint φ to the program P.

The above method is now illustrated with reference to a simple example. Consider the example shown in FIG. 4. In this example, the program executes three processes in parallel: T1vT2vT3. Different interleavings of the statements executed by these processes lead to different values being assigned to y1 and y2. In every execution of the program there is a single value assigned to y1 and a single value assigned to y2. The assertion in T3 requires that the values of y1 and y2 are not equal. Assuming initial values of 0's for the variables, for example, y1 gets the value 6, and y2 gets the value 2 in the interleaving z++; x+=z; x+=z; y1=f(x); y2=x; z++; assert. In the interleaving x+=z; x+=z; y1=f(x); y2=x; z++; z++; assert, y1 gets the value 5, and y2 gets the value 0.

Figure 2:
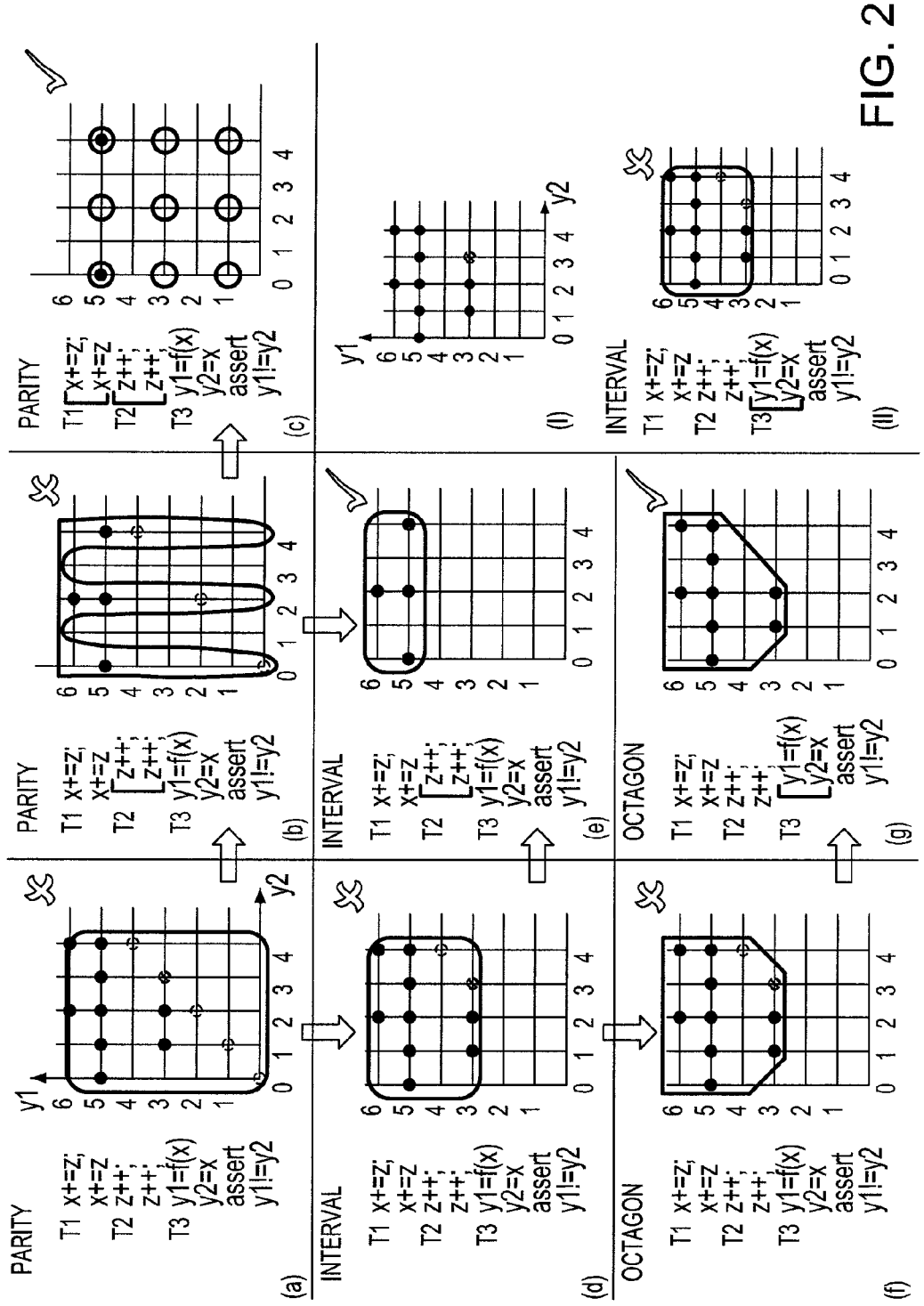
FIG. 2 illustrates values that can arise in the example code of FIG. 4.

FIG. 2 at (I) shows the possible values of y1 and y2 that can arise during all possible program executions, assuming that the macro f executes atomically, i.e., there is no context switch while a process executes the macro f. Note that in some interleavings y1 and y2 may be evaluated for different values of x (i.e., x can be incremented between the assignment to y1 and the assignment to y2). The point y1=y2=3 corresponds to values that violate the assertion. These values arise in the following interleaving:

z++; x+=z; y1=f(x); z++; x+=z; y2=x; assert.

The technique of the present disclosure adds efficient synchronization to the program such that the assertion in T3 is not violated in any execution. The Abstraction-Guided Synthesis (AGS) algorithm iteratively eliminates invalid interleavings observed under an abstraction by either modifying the program or the abstraction.

Figures 3, 4:
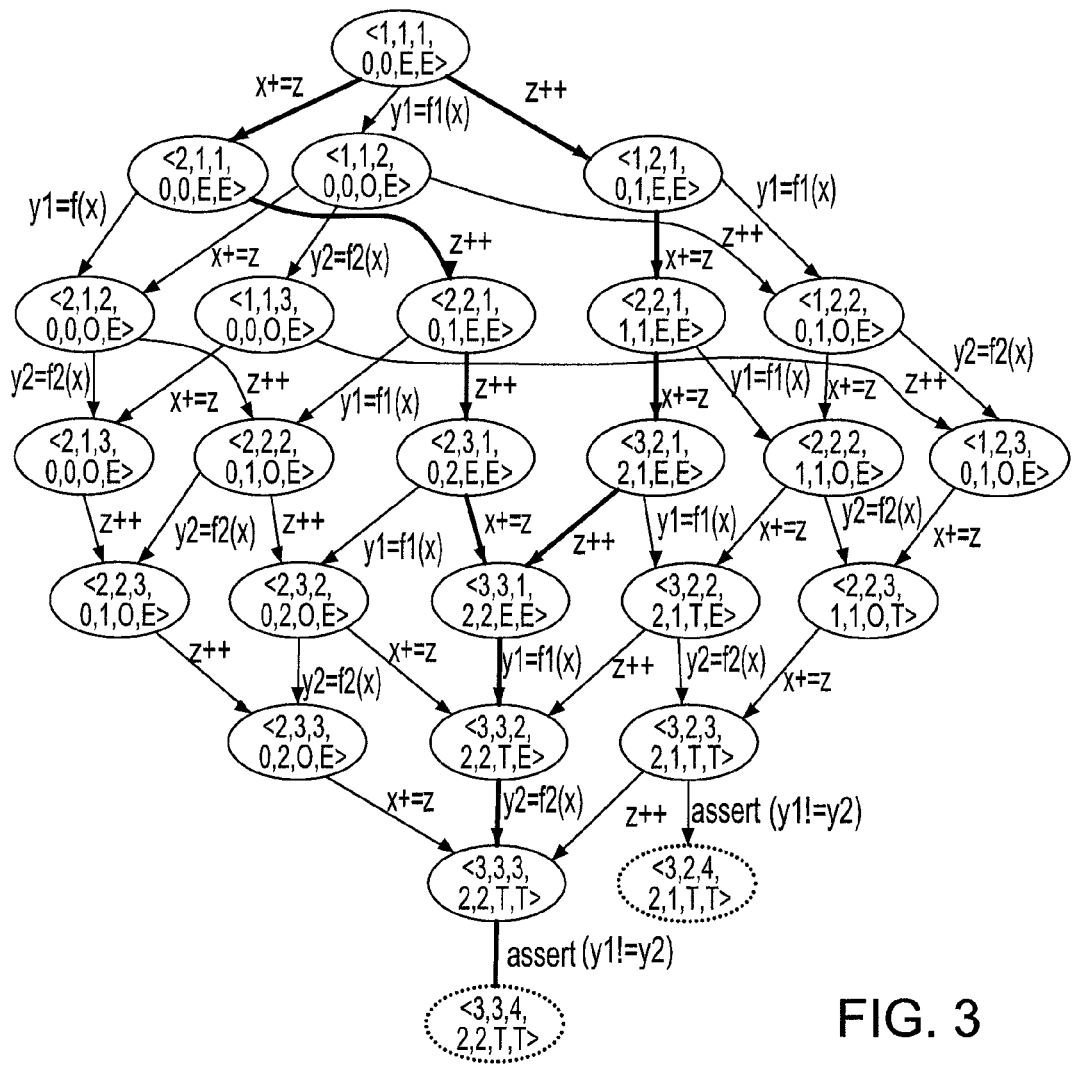
FIG. 3 illustrates an example of partial abstract transition system for the program of FIG. 4.
FIG. 4 is an example code that can be verified.

FIG. 2 shows how the algorithm operates on the program of FIG. 4, and how it can move on both dimensions, choosing to modify either the program, or the abstraction, on every step. Before describing FIG. 2 in detail, the following describes how the algorithm modifies the program to eliminate invalid interleavings without any abstraction. The present disclosure allows for enabling the choice between abstraction refinement and program restriction, and also provides a technique for program restriction. The technique for program restriction described in this disclosure may be used independent of the abstraction and the techniques used for abstraction refinement.

The example program is considered initially without abstraction. The algorithm accumulates atomicity constraints by iteratively eliminating invalid interleavings. Every invalid interleaving yields an atomicity constraint that describes all possible ways to eliminate that interleaving, by disabling context-switches that appear in it.

Under full information, the program shown in FIG. 4 has a single invalid interleaving z++; x+=z; y1=f(x); z++; x+=z; y2=x; assert. This interleaving can be eliminated by disabling either of the following context switches, which appear in this interleaving: the context switch between the execution of x+=z and x+=z in T1, between z++ and z++ in T2, and between y1=f(x) and y2=x in T3. This corresponds to the following atomicity constraint, generated by AGS algorithm: [y1=f(x), y2=x] ∨ [x+=z, x+=z] ∨ [z++, z++]. This constraint is a disjunction of three atomicity predicates, of the form [s1,s2], where s1 and s2 are consecutive statements in the program. Each atomicity predicate represents a context-switch that can eliminate the invalid interleaving, and the disjunction represents the fact that one of these three may be chosen to eliminate the invalid interleaving. For this program, there are no additional constraints, and any satisfying assignment to this constraint yields a correct program. For example, adding an atomic section around the statements z++ and z++ in T2 yields a correct program.

Since multiple solutions may be obtained as above, a quantitative criterion for choosing among them also may be defined. This criterion can be based on the number of atomic sections, their length, and other criterion. In one aspect, the approach of the present disclosure separates the process of identifying the space of solutions (generating the atomicity constraints) from the process of choosing between the possible solutions, which can be based on a quantitative criterion. In this example, each of the three possible solutions only requires a single atomic section of two statements.

Next, the AGS algorithm of the present disclosure operating under abstraction is illustrated. In this example, simple numerical domains are used: parity, intervals, and octagon abstractions. It is first shown how the algorithm works using the parity abstraction over y1 and y2. The parity abstraction represents the actual value of a variable by its parity, and only observes whether the value is even or odd. Variables y1 and y2 take abstract values from, {⊥,E,O,T}, with the standard meaning: ⊥ means that the value is non-initialized, E means that the value is even, O means that the value is odd, T means that the value is unknown (either even of odd).

The starting point, parity abstraction of the original program, is shown in FIG. 2 at (a). It shows the concrete values of y1 and y2 that can arise during program execution, and their abstraction. The concrete values are shown as full circles and are the same as in FIG. 2 at (I). The black circles denote the concrete values that satisfy the assertion, and the red dotted circle violates the assertion. The shaded area denotes the concretization of the abstract values computed for y1 and y2. The abstract values for both y1 and y2 are T. As a result, the concretization (the shaded area) covers the entire plane. In particular, it covers concrete values that violate the assertion, some of which do not arise in any concrete execution of this program (false alarms). Such values are denoted by hollow red dotted circles in this figure.

The AGS algorithm performs abstract interpretation of the program from FIG. 4 using parity abstraction. FIG. 3 shows part of the abstract transition system constructed by AGS. FIG. 3 only shows abstract states that can reach an error state. Error states are shown as dashed red line circles in the figure. The values of variables in a state are shown as a tuple ⟨pc1, pc2, pc3, x, z, y1, y2⟩, where variables y1 and y2 take an abstract value from the parity domain. Pc1, pc2, and pc3 are program counters for the three processes shown in FIG. 3, respectively. This transition system is very simple and in particular contains no cycles; however, this is only for illustrative purposes and the AGS algorithm handles all forms of abstract transition systems.

Under parity abstraction, there are several invalid interleavings. An interleaving is said to be invalid when it violates the assertion in the program. The choice of which of them to eliminate first is determined. The AGS algorithm first chooses to eliminate the invalid interleaving: π1=z++; x+=z; x+=z; z++; y1=f(x); y2=x; assert. This interleaving is shown in FIG. 3 by emphasizing its edges (the right emphasized path in the figure). Under this interleaving, and under the parity abstraction, y1=T and y2=T (due to joins in the abstract transition system).

The AGS algorithm can now choose whether to try and eliminate this by either adding atomicity, or by refining the abstraction. Refining the abstraction means picking another abstraction that is able to distinguish between more program behaviors. These alternatives are shown in FIG. 2 and explained below.

Eliminate π1 by atomicity constraint: To eliminate this interleaving, the following constraint is generated: [z++, z++]. This step is shown as the step from FIG. 2 at (a) to FIG. 2 at (b). Note that the program in FIG. 2 at (b) has an atomic section around the statements z++ and z++ in T2. This limits the concrete values that y1 and y2 can take, as shown by the full circles in FIG. 2 at (b), compared to those on FIG. 2 at (a). In particular, it eliminates the error state in which y1 and y2 both have the value 3 (there is no red dotted full circle in the figure).

However, parity abstraction is not yet precise enough to verify the correctness of the resulting program, as shown by the shaded area in FIG. 2 (b). During abstract interpretation of the program, y1 takes both the values E and O, and thus goes to T. The concretization (the shared area) therefore spans all possible concrete values of y1. The abstract value of y2 remains E, therefore the concretization (the shaded area) only contains even values of y2. The abstract values represent three points that violate the assertion, shown as hollow red dotted circles in FIG. 2 (b).

After eliminating π1 by adding the constraint [z++,z++], the following (abstract) interleaving may violate the assertion: π2=x+=z; z++; z++; x+=z; y1=f(x); y2=x; assert. This interleaving yields the abstract values y1=T and y2=T (due to joins), which may violate the assertion. The interleaving π2 is shown in FIG. 3 as the left emphasized path in the figure.

Eliminate π2 by atomicity constraint: To eliminate this interleaving, the following constraint is generated: [x+=z, x+=z]. This step is shown as the step from FIG. 2 at (b) to FIG. 2 at (c). The resulting overall constraint is: [x+=z, x+=z] ∧ [z++, z++]. With this atomicity constraint, under the parity abstraction, there are no further invalid interleavings. This constraint is satisfied by a program that has the statements x+=z and x+=z of T1 execute atomically, and the statements z++ and z++ of T2 execute atomically. In this program, the abstract values are y1=O and y2=E. These abstract values guarantee that the assertion is not violated, as shown in FIG. 2 at (c).

Eliminate π2 by abstraction refinement: After eliminating the interleaving π1, all remaining concrete interleavings satisfy the assertion, but it could not be proved under parity abstraction. Instead of eliminating interleaving π2 by adding atomicity constraints, as described above, it is possible to choose to refine the abstraction from parity to interval, moving from FIG. 2 at (b) to FIG. 2 at (e). Interval abstraction is precise enough to prove this program.

The following explains inferring synchronization under interval abstraction. Instead of eliminating interleaving π1 by adding an atomicity constraint, the algorithm can choose to try and eliminate π1 by refining the abstraction from parity to interval. This corresponds to the step from FIG. 2 at (a) to FIG. 2 at (d). Under interval abstraction, the abstract values are y1=[3; 6] and y2=[0; 4], representing two points that may violate the assertion, as shown in FIG. 2 at (d). The algorithm can again choose to eliminate invalid interleavings by adding an atomicity constraint (step from FIG. 2 at (d) to FIG. 2 at (e)) or by abstraction refinement (step from FIG. 2 at (d) to FIG. 2 at (f)). In the former case, the AGS algorithm produces the overall constraint:

$$([x+=z, x+=z] \vee [z++, z++]) \wedge ([y1=f(x), y2=x] \vee [x+=z, x+=z] \vee [z++, z++]).$$

This constraint requires only one of T1 and T2 to execute atomically. FIG. 2 at (e) shows a program corresponding to one of the solutions, in which T2 is atomic.

As apparent from the atomicity constraint above, [y1=f(x), y2=x] is not sufficient for showing the correctness of the program under the interval abstraction. The result of applying interval abstraction to the program implemented from this constraint is shown in FIG. 2 at (II).

The following explain inferring synchronization under octagon abstraction. Using the octagon abstract domain (e.g., see Mine, A. The octagon abstract domain. Higher Order Symbol. Comput. 19, 1 (2006), 31-100), the abstraction maintains enough information to only require atomicity as in the aforementioned case with full information. In particular, it is sufficient to make y1=f(x) and y2=x execute atomically for the program to be successfully verified under Octagon abstraction, as shown in FIG. 2 at (g).

Algorithm 1 shown in FIG. 5 provides a declarative description of the AGS algorithm for abstraction-guided synthesis in one embodiment of the present disclosure. The algorithm takes an input program, a specification, and an abstraction, and produces a (possibly modified) program that satisfies the specification.

The main loop of the algorithm selects an abstract trace π of the program P such that π satisfies the atomicity formula φ, but does not satisfy the specification S. Then, the algorithm attempts to eliminate this invalid interleaving π by either:
  1. modifying the program: the procedure avoid generates atomicity constraints that disable π. The constraints generated by π void for π are accumulated by AGS in the formula φ.
  2. refining the abstraction: using a standard abstraction refinement approach to refine the abstraction. For example, the following publications show abstraction refinement approach. Clarke, E. M., Grumberg, O., Jha, S., Lu, Y., and Veith, H. Counterexample-guided abstraction refinement. In CAV (2000), pp. 154-169. Ball, T., and Rajamani, S. K. Automatically validating temporal safety properties of interfaces. In SPIN (2001), pp. 103-122.

The algorithm maintains a formula φ that captures the atomicity constraints which make the program satisfy the specification under the current abstraction α. On every iteration, the loop condition takes into account the updated φ and α when choosing an invalid interleaving π.

Some of the (abstract) invalid interleavings may correspond to concrete invalid interleavings, while others may be artifacts of the abstraction. The choice of whether to eliminate an interleaving via abstraction refinement, or by adding atomic sections, is left as non-deterministic choice (denoted by * in the algorithm) For example, the algorithm may only pick refinement when it is indeed possible to eliminate π using refinement). When all invalid interleavings have been eliminated, AGS calls the procedure implement to find a solution for the constraints accumulated in φ.

The following explains generating atomicity constraints, for example, shown in step 116 of FIG. 1. The procedure avoid takes a trace π as input, and generates an atomicity constraint that describes all context switches in π, and thus describes all possible ways to eliminate π by adding atomic sections to the original program.

The atomicity constraint generated by avoid is a disjunction of atomicity predicates. An atomicity predicate requires that a pair of consecutive program statements execute atomically, without interleaving execution of other threads between them.

Formally, given a program P, and a pair of program labels l and l', [l, l'] is used to denote an atomicity predicate. In the examples, [stmt(l), stmt(l')] may be written instead of [l, l']. An atomicity formula is a conjunction of disjunctions of atomicity predicates.

Let π be a trace in a (concrete or abstract) transition system of P. We say that π satisfies [l, l'], denoted by π|=[l, l'], if and only if for all $0 \leq i < |\pi|-1$, if $lbl(t_i)=l$ then $lbl(t_{i+1})=l'$ and $tid(t_i)=tid(t_{i+1})$. A set of traces Π satisfies an atomicity predicate p, denoted by Π|=p, if and only if all the traces in Π satisfy p. Similarly, conjunctions and disjunctions of atomicity predicates are interpreted as intersection and union of sets of traces. The set of traces that satisfy an atomicity formula φ is denoted by [φ]. Informally, this means that an execution of the program satisfies the constraints [l,l'] if every time that a thread executes the statement at the label l, the same thread executes the statement at label l' immediately after, and there is no other step of the program between the execution of these two statements.

The procedure "avoid" generates atomicity predicates for neighboring locations (locations that appear in the same thread, where one location immediately follows the other), with the meaning that no operation is allowed to interleave between the execution of these neighboring locations.

The algorithm identifies all context switches in π as follows. A context switch after transition πi occurs if there is another transition πj by the same thread later in the trace, but not immediately after πi. Then, if the transition πj is the first such transition after πi, the atomicity predicate [lbl(πi); lbl(πj)] is generated. For example, consider a program with two threads A and B, such that A can execute the statements $A_1$, $A_2$, and B can execute the statements $B_1$, $B_2$. Given an execution of this program in which the statements are interleaved as follows: $A_1B_1A_2B_2$, there is one context switch after $A_1$, in which the execution switches to execute an action of the thread B (namely, the action $B_1$). Then, there is another context switch after the execution of B1, in which execution returns to the thread A. Finally, after the execution of $A_2$, context is switched again, back to executing $B_2$.

In the case of an invalid sequential interleaving, an interleaving in which each thread runs to completion before it context-switches to another thread, it is not possible to avoid the interleaving by adding atomic sections. In such cases, "avoid" returns false and AGS aborts. For example, consider again a program with two threads A and B, where A has statements $A_1$, $A_2$, and B has statements $B_1$, $B_2$. Given an invalid execution $A_1A_2B_1B_2$, there is no way to avoid this execution using atomic sections, as there is no context switch to be avoided.

Abstraction refinement is explained as follows. The procedure "refine" takes an interleaving π as input and attempts to refine the abstraction in order to avoid π. For that to be possible, π has to be an artifact of the abstraction, and not correspond to a concrete invalid interleaving. AGS tries to refine the abstraction by calling refine, but if the abstraction cannot be refined, and refine returns the same abstraction, AGS aborts. In the present disclosure, refining may include different kinds of simple refinements: one that moves to another abstract domain, and one that varies the set of variables that are abstracted in a relational manner, that is, an abstract domain that maintains the correlations between values of variables.

Implementing atomicity constraints is explained as follows. The procedure "implement" in algorithm 1 takes a program P and an atomicity formula φ as input. An atomicity formula can be seen as a formula in propositional-logic, where the atomicity predicates are treated as propositional (Boolean) variables. Note that the atomicity formula is in positive conjunctive normal form (positive CNF), and thus it is always satisfiable.

The procedure constructs a program P' by finding a minimal satisfying assignment for φ, i.e., a satisfying assignment with the smallest number of propositional variables set to true. The atomicity predicates assigned to true in that assignment are then implemented as atomic sections in the program. Informally, the constraint φ describes all possible choices of (pairwise) atomic sections such that the program with these atomic sections will satisfy the specification. A satisfying assignment for φ is a choice of which atomicity predicates are required to hold. In other words, it is a choice of what consecutive statements must execute without a context-switch between them such that the constraint φ is satisfied. We are interested in the minimal satisfying assignment because we only want to restrict context switches when they must be restricted.

The approach of the present disclosure in one embodiment separates the characterization of valid solutions from their implementation. The atomicity formula φ maintained in the algorithm provides a symbolic description of possible solutions. In one aspect, the possible solutions may be realized by changing the program and adding atomic sections. However, they may be realized using other synchronization mechanisms, as well as by controlling the scheduler of the runtime environment.

In general, there could be multiple satisfying assignments for φ, corresponding to different additions of atomic sections to the input program P. Usually, minimal satisfying assignments would be of interest, as they represent solutions that do not impose redundant atomic sections.

To realize a satisfying assignment Γ|=φ as atomic sections, atomize(Γ) is defined to extract the minimal (contiguous) atomic sections from the assignment. Towards this end, the set of program labels is constructed in which context switches are not permitted by $\Gamma:L=\{l'|[l, l']\epsilon\Gamma\}$. For every maximally-connected component of L in the control-flow-graph of the original program, the algorithm finds the immediate dominator and postdominator, and adds (begin and end) atomic section at these labels, respectively. This may cause extra statements included in an atomic section, eliminating additional interleavings. This situation is sometimes unavoidable when implementing atomicity constraints using atomic sections.

It is possible that implementing an assignment Γ results in eliminating additional interleavings even when there are no extra statements in the atomic section. Consider the example of FIG. 8. In this example, T2 cannot interleave with the first iteration of the loop in T1. But once the first iteration is over, it can interleave with any other iteration. However, since implementation in one embodiment is performed via atomic sections, an atomic section around the statements x++ and x++ are added inside the loop, forcing every iteration of the loop to be executed atomically.

The following details are now addressed: how to compute $[[P]]_\alpha \cap [[\phi]]$. How to obtain an interleaving $\pi \in [[P]]_\alpha \cap [[\phi]]$ and $\pi | \ne S$? How to choose, on every step of the algorithm, whether to add atomicity constraints or to refine the abstraction.

Algorithm 2 in FIG. 6 shows the pseudocode for a realization of Algorithm 1. In the algorithm, focus is placed on the exploration code, and the code for the case of avoiding an interleaving (Lines 10-14), the code for the case of refinement is symmetrical and is abbreviated here to a comment in Line 16.

The algorithm combines (forward) abstract interpretation of the program, with (backward) exploration of invalid interleavings. The main idea of the algorithm is to leverage the known constraints accumulated in $\phi$ in order to restrict the space that has to be explored both forward and backward. $\phi$ is used especially in exploration backward in practice. The algorithm is amenable to several optimizations.

Forward abstract interpretation is explained as follows. The abstract interpretation part of the algorithm can be standard, and uses a workset to maintain abstract states that should be explored. Once the workset is empty, a fixed point is reached. The algorithm uses the join operator of the abstract domain to add new states to the set states of explored abstract states (Line 20). More generally, the algorithm can use a widening operator (e.g., see Cousot, P., and Cousot, R., Abstract interpretation: A unified lattice model for static analysis of programs by construction of approximation of fixed points, In POPL (1977), pp. 238-252) when required by the abstract domain. To determine whether a state should be added to the set of states, a check is made to determine whether the state is already represented in states (Line 19).

The exploration in the algorithm is done on-the-fly, and at every point, the exploration of new states is restricted by the current constraints accumulated in $\phi$ (line 5). It is said that a statement st is $\phi$-enabled in a state $\sigma$ when executing st from $\sigma$ does not contradict $\phi$. For every invalid interleaving $\pi$, the formula $\phi$ represents all the possible ways to eliminate $\pi$. This means that the algorithm only restricts further exploration when the next exploration step contradicts all possible ways to eliminate existing invalid interleavings.

Formally, a statement st is $\phi$-enabled in a state $\sigma$ iff (if and only if) for all transitions t, t' such that dst(t)=src(t')=$\sigma$, stmt(t)=st, src(t)∈states, $\sigma \in [[st]]_\alpha$(src(t)), and dst(t')∈$[st]_\alpha$($\sigma$), the partial trace t.t' satisfies $\phi$.

For example, if $\phi$ is [a, c] then st is $\phi$-enabled in $\sigma$, in the partial state space shown in FIG. 9. However, if $\phi$ is [a, c] ∧ [b, c], then st is not $\phi$-enabled in $\sigma$.

Backward exploration of invalid interleavings is explained as follows. When the algorithm detects an (abstract) error state, that is, a state $\sigma'$ such that $\sigma'$s|$\ne \alpha$S, it tries to find interleavings $\pi$ leading from the initial state init to the error state $\sigma'$. At this point, the algorithm only explores states that have been already explored in the forward direction. The algorithm leverages the constraints that are already accumulated in the atomicity formula $\phi$ to prune the interleavings that have to be explored. The function Traces(init; $\sigma'$, V, $\phi$) returns only interleavings that satisfy $\phi$. It works by performing a backward exploration starting from $\sigma'$ and extending interleaving suffixes backwards. A suffix is further extended only as long as it satisfies $\phi$ (Line 9 of the function Traces). The result is a set of interleavings that satisfy $\phi$. The algorithm uses $\phi$ to prune the interleavings that are explored backwards.

Choosing $\pi$ in Algorithm 2 is explained as follows. Since program modifications include adding atomic sections, sequential executions (which have no context switches) are not eliminated. Thus, the correctness of the sequential runs of the program should be verified under the given abstraction. In fact, for verifying the correctness of interleavings that involve fewer context-switches, less precise abstractions can be sufficient. Generally, interleavings in an increasing order of the number of context switches are considered. Atomicity constraints obtained for interleavings with a lower number of context switches restrict the space that needs to be explored for interleavings with higher number of context switches.

The following compares program modification and abstraction refinement. When an invalid interleaving $\pi$ is detected, a choice is to be made between refining the abstraction and adding an atomicity constraint that eliminates $\pi$. This choice is denoted by the condition shouldAvoid($\pi$) in the algorithm. Apart from clear boundary conditions outlined below, this choice depends on the particular abstractions with which the algorithm is used.

$\pi$ is said to be a sequential interleaving when execution switches from a thread only when it terminates. That is, every thread runs without interruption from its beginning to end. When $\pi$ is a sequential interleaving, and avoid is realized as the addition of atomic sections, it is not possible to add atomicity constraints to avoid $\pi$. Therefore, in this case, the only choice is to try and refine the abstraction (if possible). Hence, the condition shouldAvoid($\pi$) is set to return false when $\pi$ is a sequential interleaving.

Similarly, depending on the refinement framework used, it may be not be possible to further refine the abstraction $\alpha$. For example, when using a fixed sequence of abstraction with increasing precision, upon reaching the most precise abstraction in the sequence, there may be no way to further refine the abstraction. Therefore, in this case, the only choice is to try and avoid the interleaving $\pi$, and the condition shouldAvoid($\pi$) returns true when it is known a priori that $\alpha$ cannot be refined anymore.

For refinement schemes that use symbolic backwards execution to try and find a concrete counterexample (e.g., Clarke, E. M., Grumberg, O., Jha, S., Lu, Y., and Veith, H. Counterexample-guided abstraction refinement. In CAV (2000), pp. 154-169. Ball, T., and Rajamani, S. K., Automatically validating temporal safety properties of interfaces, In SPIN (2001), pp. 103-122), the condition shouldAvoid($\pi$) can be based on the result of the symbolic backward execution. When the refinement scheme is able to find a concrete counterexample, shouldAvoid($\pi$) can choose to repair, and use the concrete counterexample as basis. If the refinement scheme fails to find a concrete counterexample, but also fails to find a spurious path for abstraction refinement, shouldAvoid($\pi$) can again choose to repair, as refinement cannot be applied.

In some cases, attempting verification with a refined abstraction may fail due to state explosion. Since in most cases there is no way to predict such failure, there is no way to check this a priori in the condition shouldAvoid($\pi$). Practically, it is useful to invoke the verification procedure as a separate task, and implement a backtracking mechanism that backtracks the abstraction refinement in the case verification fails to terminate after a certain time. Backtracking the refinement will possibly enable successful verification of a more constrained variant of the program.

Optimizations: Rebuilding Parts of the Transition System: In one aspect, optimization may be employed in rebuilding the program or abstraction. For example, instead of rebuilding the whole transition system whenever a constraint to φ is added (line 13 of algorithm 2), or whenever the abstraction is refined, only the parts of the transition system that depend on the modification may be rebuilt. Following approaches such as those described in Henzinger, T. A., Jhala, R., Majumdar, R., and Sutre, G. Lazy abstraction, In POPL (2002), pp. 58-70, the technique of the present disclosure can invalidate only the parts of the abstract transition system that may be affected by the refinement may be invalidated, and avoid recomputation of other parts.

Simplification of φ: Rather than taking the conjunction of constraints as they are accumulated in φ, the technique of the present disclosure may preform (propositional) simplification of φ on-the-fly.

Implementability: It is possible to implement atomicity constraints by adding atomic sections to the program, or by controlling the underlying scheduler. These are two equivalent ways to reduce the set of traces such that some steps can only occur atomically. The advantage of working at the level of the scheduler is that it does not pass through the syntactic notion of a program.

Lazy Abstraction: Algorithm 2 need not maintain the same abstraction across different interleavings. The algorithm can be adapted to use lazy abstraction refinement as in Henzinger, T. A., Jhala, R., Majumdar, R., and Sutre, G. Lazy abstraction, In POPL (2002), pp. 58-70. Instead of maintaining a single homogenous abstraction a for the entire program, it is possible to maintain different abstractions for different parts of the program, and perform lazy refinement.

Supporting Additional Synchronization Primitives: The present disclosure demonstrates an approach using atomic sections as the synchronization primitive. But the procedure avoid can be realized using other forms of constraints, and the procedure implement can be also realized to use other synchronization primitives such as conditional-critical-regions (CCRs).

Multiple Solutions: The algorithm as described here only yields a single minimal solution. However, it is possible to present the user with a range of possible solutions and let the user make the choice.

The following formal definitions may be used further to understand the above methodologies.

Transition System

A system ts is a tuple. ($\Sigma$, T, Init) where $\Sigma$ is a set of states, T⊆$\Sigma$×$\Sigma$ is a set of transitions between states, and Init⊆$\Sigma$ are the initial states. For a transition t ∈ T, we use src(t) to denote the source state of t, and dst(t) to denote its destination state.

For a transition system ts, a trace $\pi$ is a (possibly infinite) sequence of transitions $\pi_0, \pi_1, \ldots$ such that for every i>0, $\pi_i$ ∈ T and dst($\pi_{i-1}$)=src($\pi_i$). For finite trace $\pi$, |$\pi$| denotes its length (number of transitions). We use t. $\pi$ to denote the trace created by concentration of a transition t and a trace $\pi$, when dst(t)=src($\pi'_0$). A complete trace $\pi$ is a trace that starts from an initial state: src($\pi_0$)∈ Init. We use [[ts]] to denote the (prefix-closed) set of complete traces of transition system ts.

Program Syntax

As an example, we consider programs written in a simple programming language with assignment, non-deterministic choice, conditional goto, sequential composition, parallel composition, and atomic sections. In this example, the language does not allow dynamic allocation of threads, nested atomic sections, and parallel composition inside an atomic section. Note that a program can be statically associated with the maximal number of threads it may create in any execution. Assignments and conditional goto statements are executed atomically. All statements have unique labels. For a program label l, we use stmt(l) to denote the unique statement at label l. We use Var to denote the set of (shared) program variables. To simplify the exposition, we do not include local variables in definitions, although we do use local variables in examples. There is nothing in our approach that prevents us from using local variables. We assume that all program variables have integer values.

Program Semantics

Let P be a program with variables Var. Let k be the maximal number of threads in P, with thread identifiers $1, \ldots, k$. A state s is a triplet (val$_s$, pc$_s$, atomic$_s$) where val$_s$: Var→Int is a valuation of the variables, pc$_s$:$\{1, \ldots, k\}$→Int is the program counter of each thread, which ranges over program labels in the code executed by the thread, and atomic$_s$∈ $\{0, \ldots, k\}$ is the thread identifier of the (unique) thread executing inside an atomic section, or 0 if no thread is currently executing inside an atomic section.

We define a transition system for a program P to be ($\Sigma_P$, $T_P$, Init$_P$) where transitions $T_P$ are labeled by program statements. For a transition t ∈ $T_P$, we use stmt(t) to denote the corresponding statement. We use lbl(t) and tid(t) to denote (unique) program label and thread identifier that correspond to stmt(t), respectively.

A transition t is in $T_P$ if all of the following conditions hold:
(a) the program counter of the thread tid(t) in state src(t) is at program label lbl(t),
(b) the execution of the statement stmt(t) from state src(t) by thread tid(t) results in state dst(t),
(c) if stmt(t) is inside an atomic section and it is not leading outside of the atomic section, then atomic$_{dst(t)}$=tid(t), otherwise atomic$_{dst(t)}$=0.

We use [[P]] to denote the set of traces of P, i.e., [[P]]=[[ts]] where ts=⟨ $\Sigma_P$, $T_P$, Init$_P$⟩.

Abstraction

The following is a review of relevant terminology used in the disclosure, which are based on abstract interpretation.

An abstract domain is a complete join semilattice A=(A, β, 7, ζ), i.e., a set A equipped with partial order β, such that for every subset X of A, A contains a least upper bound (or join), denoted 7X. The bottom element $\zeta_\chi$A is 7∅. We use x 7 y as a shorthand for 7$\{x, y\}$.

An abstract transformer for a program statement st is denoted by ⇓ st ◇ $_\alpha$:A→A. We use α to collectively name all the components of an abstract interpreter: its abstract domain, abstract transformers, and widening operator, if defined.

We define an abstract transition for P and α to be ($\Sigma_P$; $T_P$; Init$_P$), where Init$_P$=α (Init$_P$), and a transition (s, s') labeled by a program statement st is in $T_P$ if $\{s'\} \subseteq$ ⇓ st ◇ $_\alpha$(s).

We use ⇓ P ◇ $_\alpha$ to denote the set of abstract traces of P, i.e., ⇓ P ◇ $_\alpha$=⇓ ts ◇ where ts is the abstract transition system for P and α, in which $\Sigma_P$ is the result of abstract interpretation, i.e., the set of abstract states at fixed point.

Specification

The user can specify a state property S, which describes a set of program states. This property can refer to program variables and to the program counter of each thread (e.g., to model local assertions). Our approach can be extended to handle any temporal safety specifications, expressed as a property automaton, by computing the synchronous product of program's transition system and the property automaton.

Given a (concrete or abstract) state s, we use s S to denote that the state s satisfies the specification S. We lift it to traces as follows. A trace π satisfies S, denoted by ⑥ S, if and only if src($π_0$) S and for all I≧0, dst($π_I$), S. A set Π of (concrete or abstract) traces satisfies S, denoted by Π|=S if and only if all traces in it satisfy S.

Example programs which may apply the algorithms of the present disclosure may include programs in which two or more processes or thread should not access the same location simultaneously, for instance, those that involve double buffering, concurrent defragmentation, 3-dimensional grid computation, array initialization in which a three dimensional array is initialized by two processes, and alternating array removal in which elements are removed from a shared array by two processes in an alternating fashion.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 10:
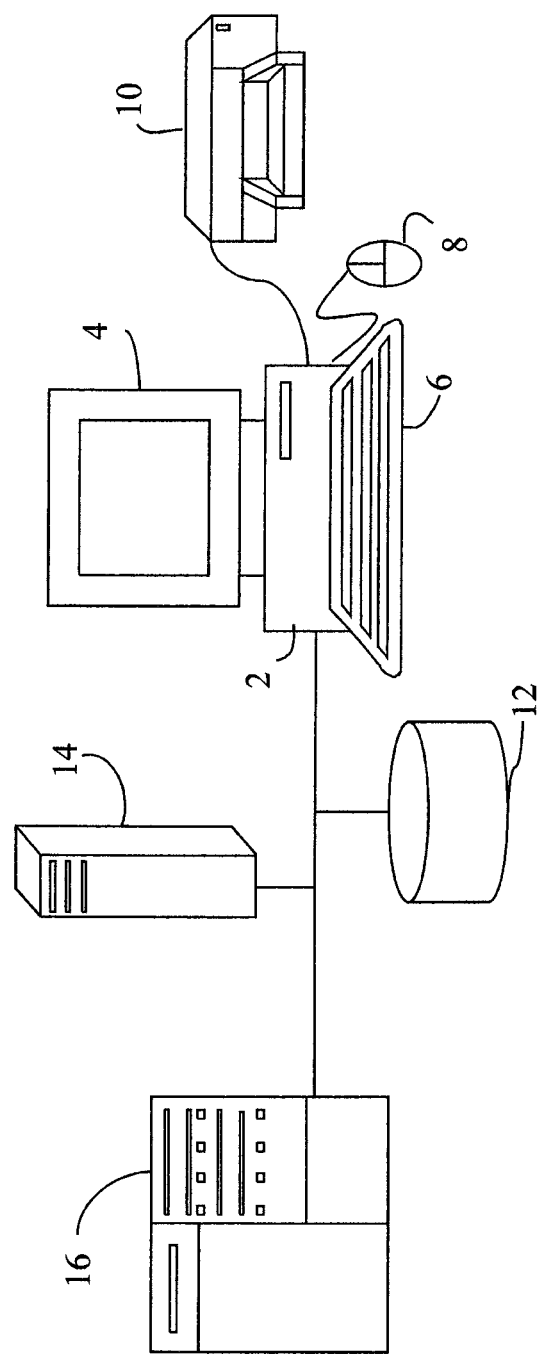
FIG. 10 illustrates an example of a computer system, in which the systems and methodologies of the present disclosure may be carried out or executed.

Referring now to FIG. 10, the systems and methodologies of the present disclosure may be carried out or executed in a computer system 2 that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 4 for presenting output displays and providing a display through which the user may input data and interact with the processing system, for instance, in cooperation with input devices such as the keyboard 6 and mouse device 8 or pointing device. The computer processing system may be also connected or coupled to one or more peripheral devices such as the printer 10, scanner (not shown), speaker, and any other devices, directly or via remote connections. The computer processing system may be connected or coupled to one or more other processing systems such as a server 10, other remote computer processing system 14, network storage devices 12, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 2, 14, 16), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for abstraction-guided synthesis, comprising:
receiving a program P, a specification S that describes desired properties of the program P, an abstraction A that defines a method for over-approximating behaviors of the program P using a bounded representation;
initializing constraint C to true;
enumerating abstract traces of the program P that satisfy the constraint C;
determining, using a processor, whether there is a trace in the abstract traces violating the specification S;
in response to determining that there is a trace that violates the specification S,
selecting a trace T that violates the specification S;
determining whether to refine the abstraction A;
in response to determining to refine the abstraction A, refining abstraction A to avoid the trace T that violates the specification S, and setting the abstraction A to be the refined abstraction;
in response to determining that the abstraction A should not be refined, computing one or more constraints that avoid the trace T that violates the specification S, and adding the constraint to the constraint C;
returning to the step of enumerating and repeating the step of determining; and in response to determining that there is no trace that violates the specification S, generating program P' that modifies the program P by including one or more constraints specified in the constraint C.

2. The method of claim 1, wherein the one or more constraints are one or more atomic sections including code statements to be executed together and not interleaved with other code.

3. The method of claim 1, wherein in response to determining that the abstraction A should not be refined, the step of computing one or more constraints that avoid the trace T that violates the specification S includes:
   determining one or more context switches that occur in the program P that create the trace T that violates the specification S; and
   computing one or more atomicity constraints that disable the one or more context switches.

4. The method of claim 3, wherein in response to determining that the abstraction A should not be refined, the step of adding the constraint to the constraint C includes:
   adding the one or more atomicity constraints in the program P.

5. The method of claim 3, wherein if there are more than one atomicity constraint computed, selecting an atomicity constraint based on one or more quantitative criteria.

6. The method of claim 5, wherein the one or more quantitative criteria includes number of atomic section in the atomicity constraints, length of atomic sections in the atomicity constraints, or combinations thereof.

7. The method of claim 1, wherein the abstraction A is refined by selecting different types of abstraction.

8. The method of claim 1, wherein the program P is a concurrent program.

9. A computer readable storage medium, not including a signal per se, storing a program of instructions executable by a machine to perform a method for abstraction-guided synthesis, comprising:
   receiving a program P, a specification S that describes desired properties of the program P, an abstraction A that defines a method for over-approximating behaviors of the program P using a bounded representation;
   initializing constraint C to true;
   enumerating abstract traces of the program P that satisfy the constraint C;
   determining, using a processor, whether there is a trace in the abstract traces violating the specification S;
   in response to determining that there is a trace that violates the specification S, selecting a trace T that violates the specification S;
   determining whether to refine the abstraction A;
   in response to determining to refine the abstraction A, refining abstraction A to avoid the trace T that violates the specification S, and setting the abstraction A to be the refined abstraction;
   in response to determining that the abstraction A should not be refined, computing one or more constraints that avoid the trace T that violates the specification S, and adding the constraint to the constraint C;
   returning to the step of enumerating and repeating the step of determining; and in response to determining that there is no trace that violates the specification S, generating program P' that modifies the program P by including one or more constraints specified in the constraint C.

10. The computer readable storage medium of claim 9, wherein the one or more constraints are one or more atomic sections that include code statements to be executed together and not interleaved with other code.

11. The computer readable storage medium of claim 9, wherein in response to determining that the abstraction A should not be refined, the step of computing one or more constraints that avoid the trace T that violates the specification S includes:
   determining one or more context switches that occur in the program P that create the trace T that violates the specification S; and
   computing one or more atomicity constraints that disable the one or more context switches.

12. The computer readable storage medium of claim 11, wherein in response to determining that the abstraction A should not be refined, the step of adding the constraint to the constraint C includes:
   adding the one or more atomicity constraints in the program P.

13. The computer readable storage medium of claim 11, wherein if there are more than one atomicity constraint computed, selecting an atomicity constraint based on one or more quantitative criteria.

14. The computer readable storage medium of claim 13, wherein the one or more quantitative criteria includes number of atomic section in the atomicity constraints, length of atomic sections in the atomicity constraints, or combinations thereof.

15. The computer readable storage medium of claim 9, wherein the abstraction A is refined by selecting different types of abstraction.

16. The computer readable storage medium of claim 9, wherein the program P is a concurrent program.

17. A system for abstraction-guided synthesis, comprising:
   a memory device operable to store a program P, a specification S that describes desired properties of the program P, an abstraction A that defines a method for over-approximating behaviors of the program P using a bounded representation; and
   a processor operable to initialize constraint C to true, enumerate abstract traces of the program P that satisfy the constraint C and determine whether there is a trace in the abstract traces violating the specification S,
   the processor in response to determining that there is a trace that violates the specification S, further operable to select a trace T that violates the specification S, determine whether to refine the abstraction A,
   the processor in response to determining to refine the abstraction A, further operable to refine the abstraction A to avoid the trace T that violates the specification S, and set the abstraction A to be the refined abstraction,
   the processor in response to determining that the abstraction A should not be refined, further operable to compute one or more constraints that avoid the trace T that violates the specification S, and add the constraint to the constraint C;
   the processor further operable to repeat the enumeration of abstract traces and computing of one or more constraints; and
   the processor in response to determining that there is no trace that violates the specification S, further operable to generate program P' that modifies the program P by including one or more constraints specified in the constraint C.

18. The system of claim 17, wherein the one or more constraints are one or more atomic sections that include code statements to be executed together and not interleaved with other code.

19. The system of claim 17, wherein in response to determining that the abstraction A should not be refined, the processor computes one or more constraints that avoid the trace T that violates the specification S by determining one or more context switches that occur in the program P that create the trace T that violates the specification S, and computing one or more atomicity constraints that disable the one or more context switches.

20. The system of claim 19, wherein in response to determining that the abstraction A should not be refined, the processor adds the constraint to the constraint C by adding the one or more atomicity constraints in the program P.

21. The system of claim 20, wherein if there are more than one atomicity constraint computed, the processor is operable to select an atomicity constraint based on number of atomic section in the atomicity constraints, length of atomic sections in the atomicity constraints, or combinations thereof.

* * * * *